United States Patent [19]

Waldschmidt et al.

[11] 4,424,684
[45] Jan. 10, 1984

[54] CONDENSER SECTION FOR CONTAINER REFRIGERATION UNIT

[75] Inventors: William L. Waldschmidt, Farmington; Donald D. King, Chanhassen, both of Minn.

[73] Assignee: Thermo King Corporation, Minneapolis, Minn.

[21] Appl. No.: 337,060

[22] Filed: Jan. 5, 1982

[51] Int. Cl.³ .............................................. B60H 3/04
[52] U.S. Cl. ....................................... 62/239; 62/263; 62/448
[58] Field of Search .......................... 62/239, 263, 448

[56] References Cited

U.S. PATENT DOCUMENTS

| Re. 21,298 | 12/1939 | Nelson | 62/263 |
|---|---|---|---|
| 2,175,946 | 10/1939 | Smith | 62/263 X |
| 2,526,243 | 10/1950 | Lange | |
| 3,163,995 | 1/1965 | Maier | 62/241 |
| 3,209,550 | 10/1965 | Charron et al. | 62/243 |
| 3,308,634 | 3/1967 | Smith | 62/263 |
| 3,315,488 | 4/1967 | Lind | 62/241 |
| 3,831,395 | 8/1974 | Levy | 62/263 |
| 3,885,398 | 5/1975 | Dawkins | 62/89 |
| 3,943,728 | 3/1976 | Maudlin | 62/507 |
| 3,984,224 | 10/1976 | Dawkins | 62/89 |

Primary Examiner—Lloyd L. King
Attorney, Agent, or Firm—E. C. Arenz

[57] ABSTRACT

A container refrigeration unit is provided with a forwardly open condenser pocket 40 in which is located a condenser coil 50 near the upper portion of the pocket and in a generally centered location, the coil being mounted in an inverted disposition and provided with a bottom plate 52 and a front plate 54 with a fan ring opening 56 so that air is drawn into the condenser coil from the top and sides, the remaining U-shaped space in the pocket to the sides and bottom of the condenser being available to accommodate the electric motor compressor 60, the control box 62, an operations recorder 64, and if required a power transformer 66.

4 Claims, 2 Drawing Figures

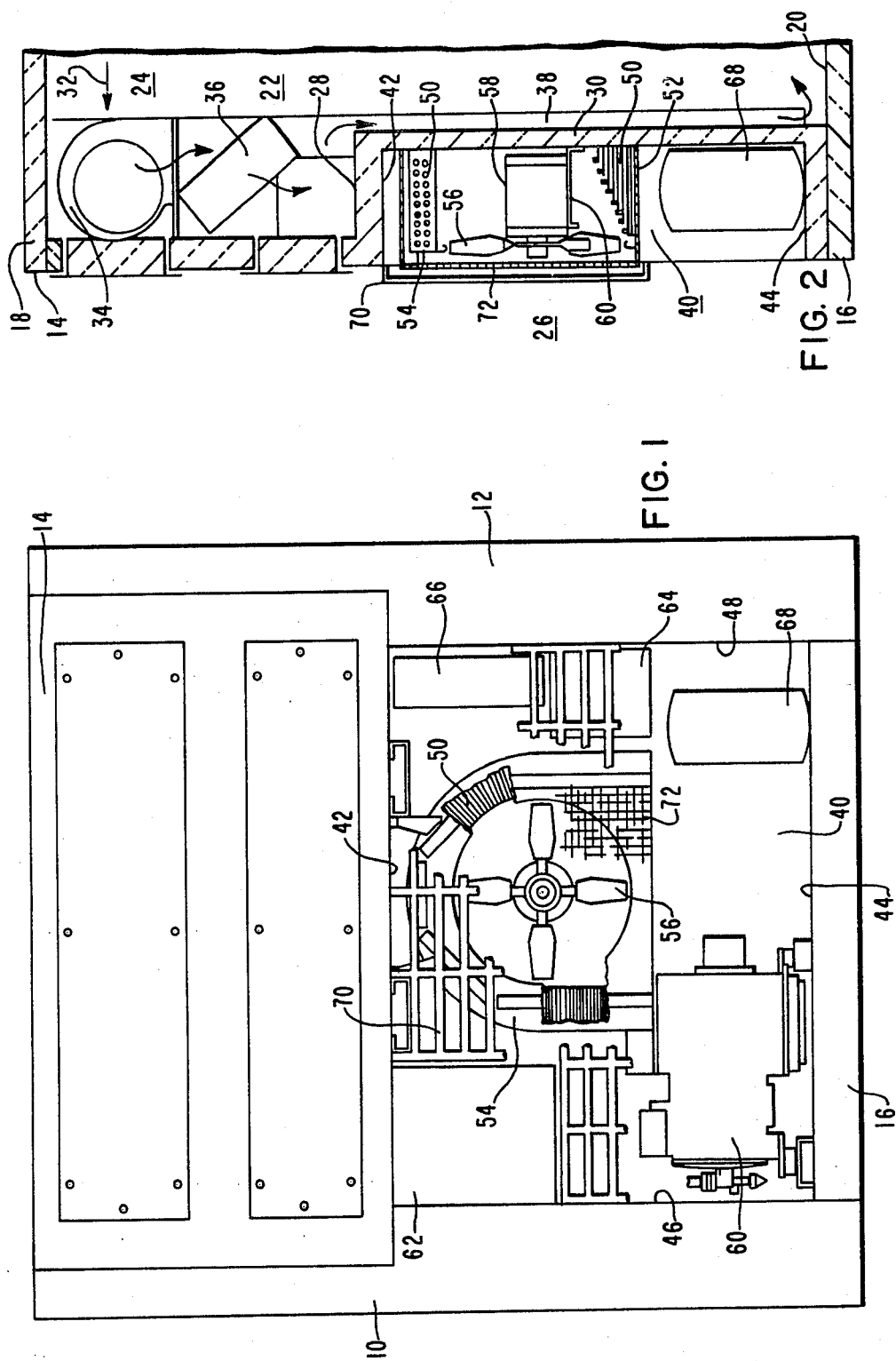

CONDENSER SECTION FOR CONTAINER REFRIGERATION UNIT

CROSS-REFERENCE TO RELATED APPLICATION

U.S. Patent application Ser. No. 337,181 filed Jan. 5, 1982 is a related patent application in the sense that at least a portion of the disclosure therein is directed to the same device as that in which this invention is incorporated.

BACKGROUND OF THE INVENTION

This invention pertains generally to the art of container refrigeration units and particularly to a component arrangement provided in what is called the condenser section of such a container unit.

As is set forth in U.S. Pat. No. 4,257,240, and as is well known to those skilled in the art, there are a number of features which are considered desirable in the structural arrangements of such units to provide various advantages over the prior art structures.

The present invention is concerned with a structural arrangement of the condenser section of a particular type of container refrigeration unit. Among the advantages which are considered to be obtained with an arrangement according to the invention is the provision of more uniform air flow over the entire condenser coil, a reduction in the amount of coil material required, all of this permitting the use of a smaller fan and motor.

SUMMARY OF THE INVENTION

In accordance with the invention, there is provided in a transport refrigeration unit of the type having a lower condenser section and an upper evaporator section and with a forwardly opened pocket generally defining the condenser section, a U-shaped refrigerant condenser coil disposed in the pocket in an inverter disposition and located in the upper central part of the pocket so that an upwardly open, U-shaped space is provided in the pocket to the sides and bottom of the coil, this space being occupied by a number of refrigeration system components including at least an electric-motor-compressor, an electric control box, and an operations recorder. The bottom of the coil and the front face are blocked off so that air is drawn into the coil from the top and sides by a fan provided in a fan ring opening in the blocking plate on the face of the condenser coil. Additionally, it is preferred that air flow directing means overlying the front face of the fan ring opening be provided to direct the discharge air substantially forwardly to reduce short-circuiting of discharged air back into the condenser coil.

DRAWING DESCRIPTION

FIG. 1 is a partly broken face view of a container refrigeration unit having an arrangement according to the invention; and FIG. 2 is a generally schematic outline view in the nature of a vertical section of an arrangement according to the invention.

DESCRIPTION OF THE PREFERRED EMBODIMENT

The container unit of FIGS. 1 and 2 has a front face provided with opposite side flanges 10 and 12, and top and bottom flanges 14 and 16 which abut the margins defining a front opening in a container unit having top and bottom walls 18 and 20 (FIG. 2) with the refrigeration unit being operated to serve the space 22 inside the container.

The refrigeration unit has two main sections, the upper evaporator section generally designated 24 and the lower condenser section generally designated 26. These sections are thermally insulated from each other as by the horizontal thermal wall 28 between the top of the condenser section and the bottom of the evaporator section and the vertical thermal wall 30 at the rear wall of the condenser section.

In the particular arrangement illustrated in FIG. 2, the air flow from the container is as indicated by the arrows, with the air being drawn from the container by the evaporator fan means 34, discharged downwardly through the evaporator 36, with the flow then being down through a narrow passage 38 behind the condenser section, as well as along both of the opposite sides of the condenser section through passages which are not shown in the Figures. The air is then discharged from the bottom of the unit back into the container.

Passing now to the arrangement with which this invention is particularly concerned, that is, the condenser section, it is basically in the form of a forwardly open pocket generally designated 40. This forwardly open pocket is defined by the top wall 42, bottom wall 44, and the opposite side walls 46 and 48. The refrigerant coil which serves as the condenser coil 50 of the unit has a general U-shape. It is located in the pocket in the upper central portion thereof and in an inverted disposition so that the bight of the coil is near the top of the pocket while the opposite legs of the coil project toward the bottom of the pocket.

Means for blocking air flow into the condenser coil from the bottom is provided by the plate means 52 which extends between the bottom ends of the coil. A condenser coil face plate 54 covers the front edge of the coil and includes marginal means defining a generally centered fan ring opening 56 in which is situate the propeller fan 56 carried by and driven by the electric motor 58. It will be apparent from the description of the disposition and location of the condenser coil and associated fan means that an upwardly-open, generally U-shaped space is defined in the pockets to the sides and bottom of the condenser coil arrangement.

Further in accordance with the invention, a number of refrigeration system components are located in this U-shaped space in a corresponding array. These components include at least the electric-motor-compressor 60, the electric control box 62 to the left of the condenser in FIG. 1, and the operations recorder 64. Further, in some instances a power transformer 66 is provided to supply the proper voltage to the electric motor for the compressor when the supply voltage to the unit is other than which is required to operate the electric motor. Typically, the power transformers in commercial units of this general type as manufactured by the assignee of this patent application have been located in the evaporator section because of the lack of space in the condenser pocket due to a different arrangement of components therein, and in particular the provision of a condenser coil which extended in a straight line across the width of the pocket. It is distinctly advantageous to be able to put the power transformer in the condenser pocket, as distinguished from the evaporator section, since it generates considerable heat in operation and thus, when in the evaporator section requires additional cooling to overcome that heat load.

In addition to the major refrigeration system components arrayed in the condenser pocket and referred before, the space also accommodates a vessel 68 used when the conditions of operation call for the refrigerant to be water cooled rather than air cooled.

A safety grille 70 (only a portion of which is shown in FIG. 1) overlies the general area of the coil and fan to prevent intrusion into the fan space. Between this openwork grille and the fan ring opening is located a honeycomb-like panel 72 for directing the discharge air from the propeller fan substantially forwardly sufficiently far to reduce short circuiting of the discharge air back into the condenser coil. As presently contemplated, the honeycomb panel is about 0.5 inch (1.27 cm) thick, and the interstices have a depth-to-width ratio in the order of about 1.33 to 1. It has been found the provision of this honeycomb panel significantly reduces tendency to short circuit discharge air back into the coil, without unduly restricting air flow.

In that connection it will be appreciated that when the condenser fan is operating, air from the vicinity of the front of the unit is drawn into the coil from the sides and top of the coil and then is discharged from the interior of the coil forwardly.

We claim:

1. A relatively large transport refrigeration unit of the type and size used on large container units typically carried by ship and rail including:
    a lower condenser section and an upper evaporator section thermally insulated from each;
    said condenser section being defined by a rear wall, top and bottom walls, and opposite side walls together forming a forwardly open pocket;
    a U-shaped refrigerant condenser coil in said pocket in inverted disposition and located in the upper central portion of said pocket so that an upwardly open, U-shaped space in said pocket is defined to the sides and bottom of said coil, a number of refrigeration system components including at least an electric-motor-compressor, an electric control box, and an operations recorder in a U-shaped array in said U-shaped space in said pocket;
    plate means extending between the ends of said condenser coil to block the admission of air from below between said ends;
    a condenser coil face plate covering the front edge of said coil and defining a generally centered fan ring opening;
    a propeller fan and motor mounted in said condenser coil with said fan disposed in said opening and operable to draw air into said coil from the top and sides and discharge the air forwardly.

2. A unit according to claim 1 wherein:
    said number of system components includes a power transformer.

3. A unit according to claim 1 including:
    air flow directing means overlying the front face of said ring opening for directing said discharge air substantially forwardly to reduce short circuiting of discharge air back into said condenser coil.

4. A unit according to claim 3 wherein:
    said air flow directing means comprises a honeycomb-like panel having interstices with a depth to width ratio in the order of between about $1\frac{1}{4}$ to 1 to $2\frac{1}{2}$ to 1.

* * * * *